(12) United States Patent
Yim

(10) Patent No.: US 7,263,071 B2
(45) Date of Patent: Aug. 28, 2007

(54) CONNECTIONLESS TCP/IP DATA EXCHANGE

(75) Inventor: Wai Yim, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 880 days.

(21) Appl. No.: 10/681,732

(22) Filed: Oct. 8, 2003

(65) Prior Publication Data

US 2005/0078604 A1 Apr. 14, 2005

(51) Int. Cl.
H04L 12/16 (2006.01)
H04A 11/00 (2006.01)
(52) U.S. Cl. ...................... 370/260; 370/466
(58) Field of Classification Search ............... 370/259, 370/260, 261, 264, 389, 392, 465, 466, 467, 370/474; 379/202.01, 207.13; 455/414.1, 455/416
See application file for complete search history.

(56) References Cited

U.S. PATENT DOCUMENTS

| 5,958,053 A | 9/1999 | Denker |
| 6,018,530 A | 1/2000 | Chakravorty |
| 6,226,680 B1 | 5/2001 | Boucher et al. |

(Continued)

FOREIGN PATENT DOCUMENTS

JP 2001-77865 3/2001

(Continued)

OTHER PUBLICATIONS

Victor Paulsamy et al., "Network Convergence and the NAT/Firewall Problems", *Proceedings of the 36th Hawaii International Conference on System Sciences (HICSS '03)*, 2002 IEEE.

(Continued)

*Primary Examiner*—Ajit Patel

(57) ABSTRACT

A communication protocol, and a method and system of communication exchange between systems over a communication network includes establishing a connection between a first system and a second system. Data is formatted by the first system into an IP datagram with an IP header and one of a TCP and a UDP header. A connectionless TCP/IP header is constructed to add to the formatted data. The connectionless TCP/IP header includes a pre-defined identifying value in a designated field, and a checksum to validate that a connectionless TCP/IP header has been identified. The formatted data having the connectionless TCP/IP header is transmitted from the first system to the second system, and the pre-defined identifying value in the designated field is verified to identify the connectionless TCP/IP header. The connectionless TCP/IP header is then removed from the IP datagram, and the IP datagram is processed.

30 Claims, 8 Drawing Sheets

U.S. PATENT DOCUMENTS

| | | |
|---|---|---|
| 6,310,892 B1 | 10/2001 | Olkin |
| 6,338,131 B1 | 1/2002 | Dillon |
| 6,360,265 B1 | 3/2002 | Falck et al. |
| 6,424,626 B1 | 7/2002 | Kidambi et al. |
| 6,470,020 B1 | 10/2002 | Barker et al. |
| 7,073,196 B1* | 7/2006 | Dowd et al. ............... 726/14 |
| 2002/0010938 A1 | 1/2002 | Zhang et al. |
| 2002/0042832 A1* | 4/2002 | Fallentine et al. .......... 709/230 |
| 2002/0085561 A1 | 7/2002 | Choi et al. |
| 2002/0091831 A1 | 7/2002 | Johnson |
| 2002/0124095 A1 | 9/2002 | Sultan |
| 2002/0133549 A1 | 9/2002 | Warrier et al. |
| 2002/0147826 A1 | 10/2002 | Sultan |
| 2002/0152325 A1 | 10/2002 | Elgebaly et al. |
| 2002/0156903 A1 | 10/2002 | Bach Corneliussen |
| 2002/0184390 A1* | 12/2002 | Alkhatib ................... 709/245 |
| 2003/0048780 A1 | 3/2003 | Phomsopha |
| 2004/0088571 A1* | 5/2004 | Jerrim et al. .............. 713/201 |
| 2004/0098619 A1* | 5/2004 | Shay ......................... 713/201 |
| 2006/0089994 A1* | 4/2006 | Hayes ....................... 709/227 |
| 2007/0086454 A1* | 4/2007 | Grinfeld ..................... 370/389 |

FOREIGN PATENT DOCUMENTS

| | | |
|---|---|---|
| WO | WO98/34384 | 8/1998 |

OTHER PUBLICATIONS

Bakre et al., "Implementation and Performance Evaluation of Indirect TCP", *IEEE Transactions on Computers*, vol. 46, No. 3, Mar. 1997, pp. 260-278.

Balakrishnan et al., "Improving TCP/IP Performance over Wireless Networks", *Proceedings of the First Annual International Conference on Mobile Computing and Networking*, 1995, pp. 2-11.

"Ridgeway Systems H.323 Firewall/NAT Problem Fix", oldwww.internet2.edu/commons/html/h232-firewall-nat.html, 2003.

B. Goode, "Voice Over Internet Protocol (VoIP),"*Proceedings of the IEEE*, vol. 90, No. 9, Sep. 2002, pp. 1495-1517.

"How to Establish NetMeeting Connections Through A Firewall" support.Microsoft.com, May 2000.

\* cited by examiner

CONNECTIONLESS TCP/IP DATA EXCHANGE

BACKGROUND OF THE INVENTION

1. Field of the Invention

The present invention relates generally to the transmission of information across the Internet, and more specifically to methods, systems, and apparatus for rapid, real-time transmission of information across the Internet and within networks and networked systems.

2. Description of the Related Art

Many Internet based applications require rapid transmission and exchange of data for effective implementation. By way of example, H323 Internet video conferencing provides rapid, real time data exchange to present video and audio data for participants in local and remote settings. Typically, to realize the benefits of necessary rapid data exchange, data is transmitted over unreliable User Datagram Protocol/Internet Protocol (UDP/IP). The advantage of using the unreliable UDP over the reliable Transmission Control Protocol (TCP, also TCP/IP) is primarily an advantage of speed. UDP has less overhead since it does not transmit packet acknowledgement, packet verification, requests for packet re-transmission, etc. In real time media transmission and play-back, such transmissions and verification processes impact the overall system performance severely.

TCP serves as essentially the standard for most Internet data transmission. TCP maintains the highest degree of reliability by ensuring all data is received, received in the correct order, and that the data received is accurate and consistent with the data that was transmitted. In many applications, such reliability is paramount for effective data transmission. The highest degree of reliability, however, is not necessary for all Internet data transmission. In such applications as H323 Internet video conferencing, for example, speed is paramount. Most applications can easily compensate for occasionally missed audio data, which is generally imperceptible, and similarly, occasionally missed or garbled video data is generally easily tolerated and of little hindrance to video conferencing sessions.

FIG. 1 is a system schematic 10 of an exemplary video conferencing system arrangement illustrating various data exchange paths. Participants 12 exchange audio, video, and other media data, with each other, and often with a video conferencing or other data server 14. In such an arrangement, data exchange can be peer-to-peer 16, client-server 18, and various combinations thereof. In a typical Internet based arrangement, initial set-up and control data such as client set-up, parameter and capability for exchange, and the like, is established using TCP, and then video conferencing media would be exchanged using UDP. For example, during set-up using TCP, a port or range of ports may be designated for UDP data exchange, and then conferencing is conducted using UDP and the designated port or range of ports.

In the environment of required network and Internet security, many firewalls block or deny all incoming Internet traffic except TCP/IP. FIG. 2 shows system schematic 10 illustrated in FIG. 1 with the added features of participant firewalls 20 and data server firewall 22. In an environment in which participants 12 are all within discreet networks or locations, data exchange might be across one or more firewalls 20, 22 whether that exchange is peer-to-peer 16 or client-server 18.

When rapid, real-time transmission is desired, a firewall can and often does limit or prevent desired video conferencing capability. If a particular firewall blocks or denies all incoming Internet traffic except TCP/IP, video conferencing or other data exchange must be conducted using highly reliable, but much slower, TCP/IP, or some work-around must be established to conduct UDP data transmission and exchange. Typical solutions include designating specific ports during set-up for UDP data exchange. By way of example, an H323 session may be established with any port greater than 1028 designated for UDP data exchange. Some firewalls are designed and implemented having certain ports designated for media exchange and allowing UDP data, and some firewalls block all UDP and TCP ports except for TCP port 80, which is the designated HyperText Transfer Protocol (HTTP) port. Problems with such configurations include the lack of standardization across the various kinds and types of firewalls available, and that such work-arounds ultimately defeat the security of the firewall.

In view of the foregoing, what is needed is a method and system of Internet data exchange with the access of TCP/IP packet transmission, and with the speed and function of UDP data transmission.

SUMMARY OF THE INVENTION

Broadly speaking, the present invention fills these needs by providing a method and communication protocol for data exchange providing the access to traverse network divisions, firewalls, and the like, of TCP, and the speed of UDP. The present invention can be implemented in numerous ways, including as a process, an apparatus, a system, a device, a method, or a computer readable media. Several embodiments of the present invention are described below.

In one embodiment, a method of conducting a communication exchange between systems over a communication network is provided. The method includes the formatting of data by a first system into an IP datagram with an IP header and one of a TCP and a UDP header. A connectionless TCP/IP header is constructed to add to the formatted data. The connectionless TCP/IP header includes a pre-defined identifying value in a designated field. The method the provides for transmitting the formatted data having the connectionless TCP/IP header from the first system to a second system. The pre-defined identifying value in the designated field is verified to identify the connectionless TCP/IP header. The method then includes removing the identified connectionless TCP/IP header from the IP datagram, and processing the IP datagram.

In another embodiment, a method of communication between cooperating systems in a video conferencing system is provided. The method includes constructing a connectionless TCP/IP header. The connectionless TCP/IP header includes a flag in a designated field and a checksum in another designated field identifying the connectionless TCP/IP header. The method next provides for attaching the connectionless TCP/IP header to an IP datagram, and then transmitting the IP datagram with the connectionless TCP/IP header. The connectionless TCP/IP header is removed by a receiving cooperating system, and the IP datagram is processed without transmitting acknowledgement and without requesting verification.

In a further embodiment, a communication protocol for establishing and maintaining an exchange between cooperating systems is provided. The communication protocol provides for formatting data to be transmitted into an IP datagram, and for attaching a connectionless TCP/IP header to the IP datagram. The communication protocol further provides for transmitting the IP datagram with the connectionless TCP/IP header as a new IP datagram. The new IP datagram is received and identified as a connectionless TCP/IP header. The communication protocol further provides for removing the connectionless TCP/IP header from the new IP datagram, and then processing the new IP datagram. The new IP datagram is processed without acknowledgement and without transmitting a request for verification.

In a yet another embodiment, an integrated circuit chip for exchanging communication between cooperating systems is provided. The integrated circuit chip includes logic for constructing a connectionless TCP/IP header. The connectionless TCP/IP header includes a flag in a designated field identifying a communication as a connectionless TCP/IP communication. The integrated circuit chip further includes logic for constructing a checksum to verify the communication is a connectionless TCP/IP communication.

In another embodiment, a computer readable media having program instructions for exchanging communication between cooperating systems is provided. The computer readable media includes program instructions for constructing a connectionless TCP/IP header. The connectionless TCP/IP header has a flag in a designated field, and a checksum in another designated field, identifying the connectionless TCP/IP header. The computer readable media includes further program instructions for attaching the connectionless TCP/IP header to an IP datagram, and for transmitting the IP datagram with the connectionless TCP/IP header. The connectionless TCP/IP header is removed by a receiving cooperating system and the IP datagram is processed without transmitting acknowledgement and without requesting verification.

The advantages of the present invention over the prior art are numerous. One notable benefit and advantage of the invention is that real-time audio and video can be transmitted and exchanged across firewalls. The connectionless TCP/IP header contains valid and credible information in the various fields of the header without consuming optional field space or reserved bits. The high speed data transmission of UDP is therefore achieved, but with the access of TCP/IP. Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for a communication protocol, as well as for a method and system of data exchange is described. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Due to security concerns, the firewall is a part of essentially most systems and networks with Internet access, and is a valuable tool for safeguarding data and maintaining system integrity. Security comes at a price, however, and one price in the area of data exchange over the Internet is speed. While every firewall has its own characteristic methods for establishing and maintaining a desired level of security, it is common for firewalls to deny or block access to all but TCP/IP transmission, or to designate only certain ports or a range of ports for TCP data exchange, for UDP data exchange, or for some firewalls, for identified media exchange. Embodiments of the present invention provide for data transmission in IP datagram packets with a unique media exchange TCP header. The special media exchange TCP header looks very much like a typical TCP header, except that the special media exchange TCP header packages an essentially typical UDP datagram, and therefore the receiver does not send an acknowledgement packet, the sender does not wait for an acknowledgement before sliding the window, and the data exchange is essentially as if using UDP with a TCP header. As used herein, the special media exchange TCP header and associated data exchange is referred to as a connectionless TCP/IP header, a connectionless TCP/IP datagram, packet, etc.

Figure 1:
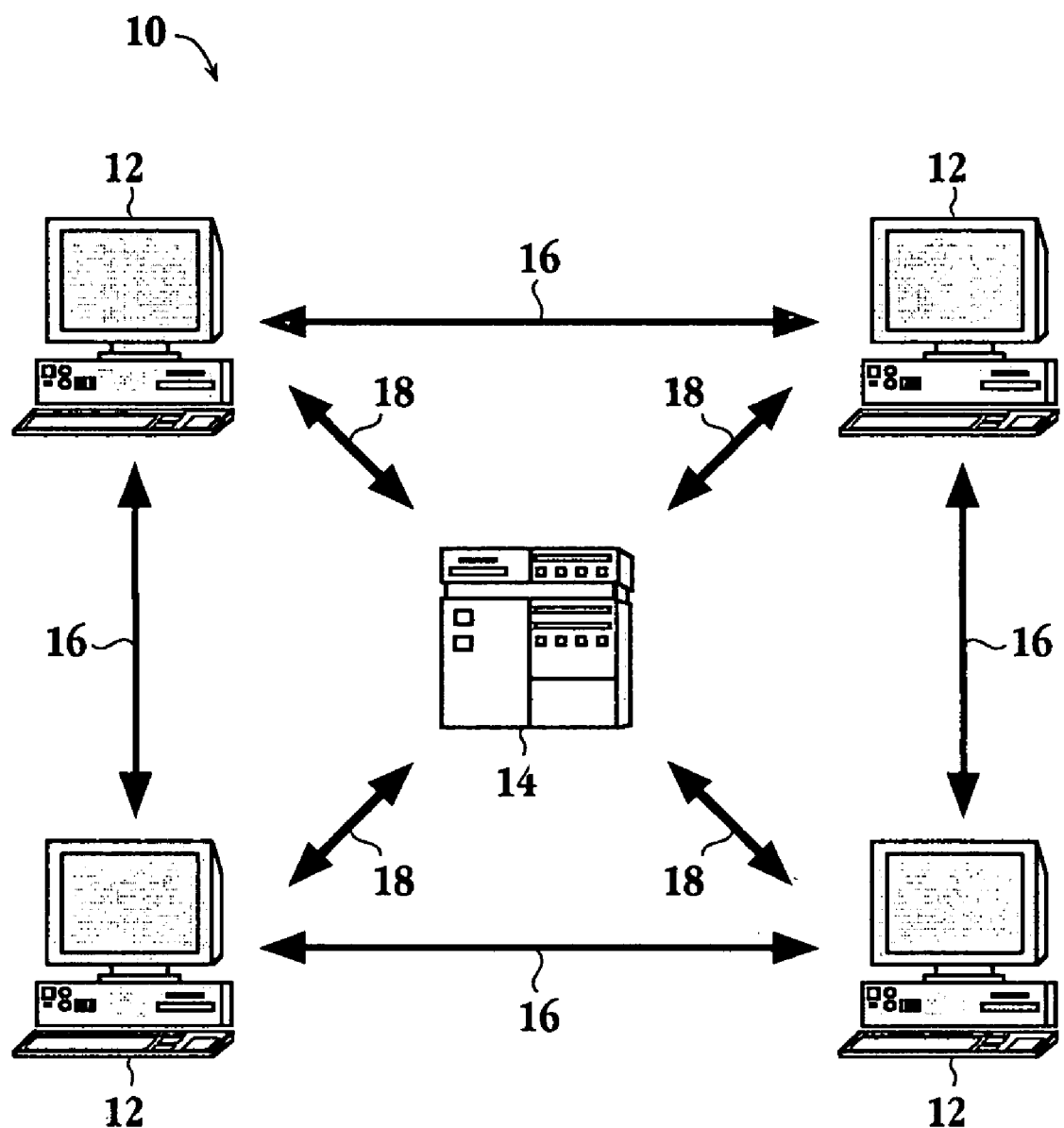
FIG. 1 is a system schematic of an exemplary video conferencing system arrangement illustrating various data exchange paths.
Figure 2:
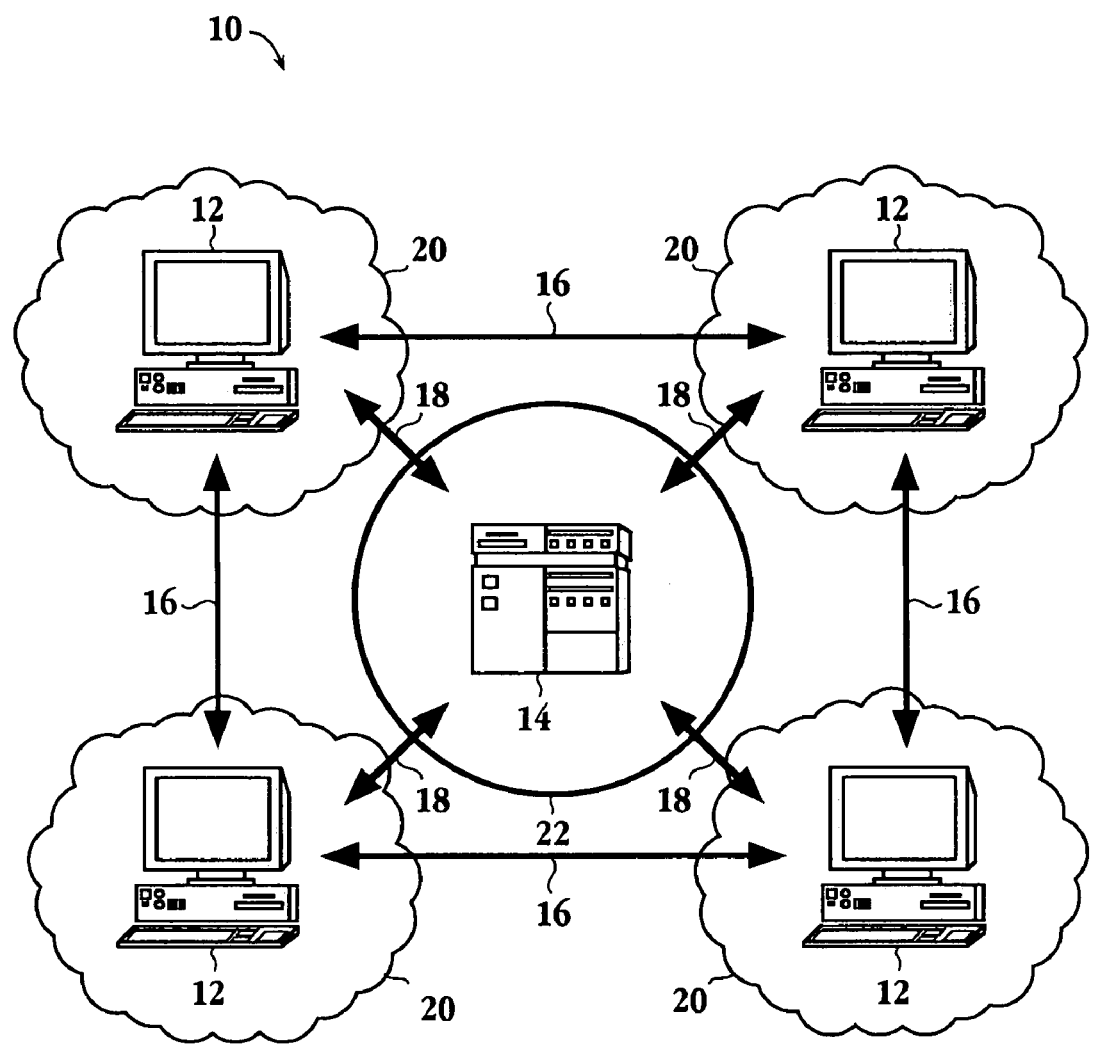
FIG. 2 shows the system schematic illustrated in FIG. 1 with the added features of participant firewalls and a data server firewall.
Figure 3:
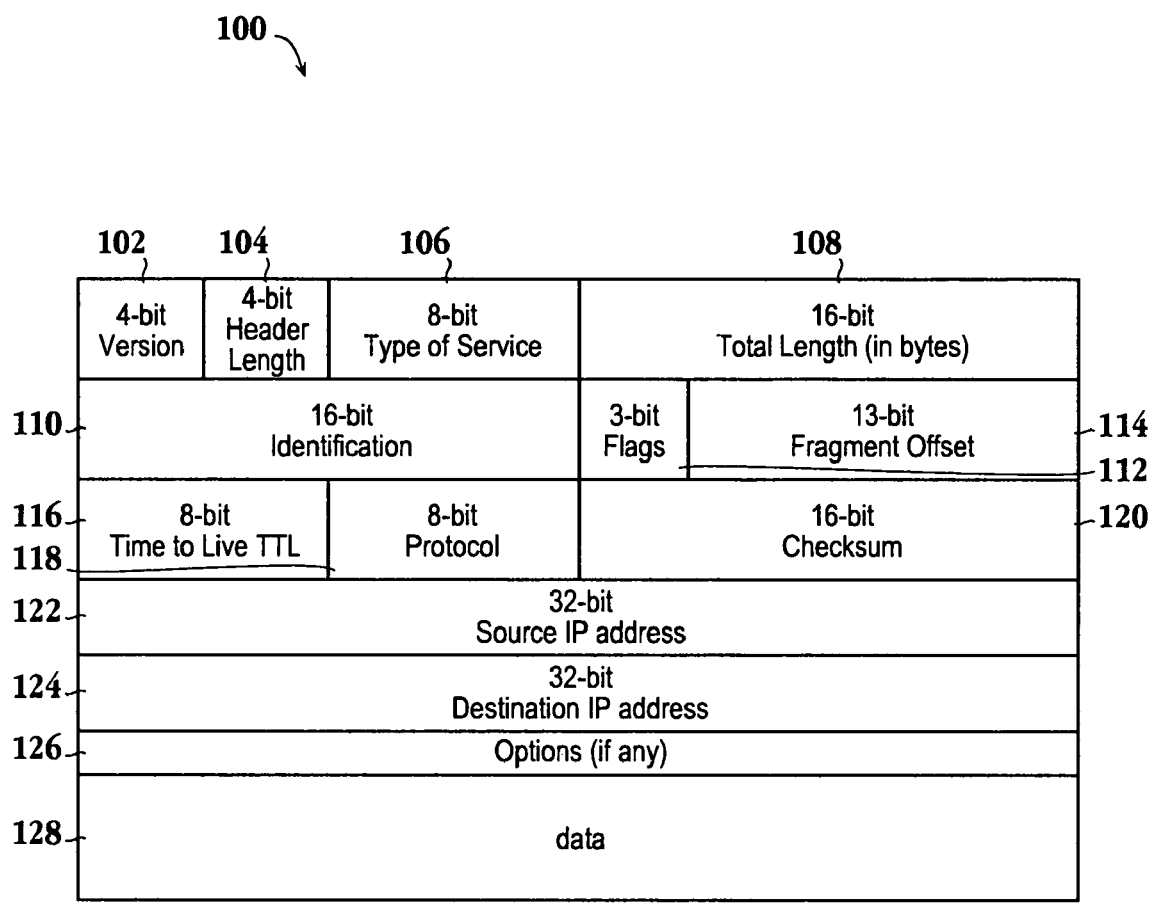
FIG. 3 is an essentially standard IP header.

FIG. 3 is an essentially standard IP header 100. Embodiments of the present invention provide for specific information to be written to particular fields in both the IP header 100, and the TCP header described below, to create a connectionless TCP/IP header. For completeness, each field in the IP header 100, as well as in the TCP header described in FIG. 4, is identified and generally described.

In the IP header 100 shown in FIG. 3, Version 102 field is 4 bits in length and indicates the format of the Internet header. Header Length 104 is also 4 bits in length and describes the Internet header length in 32-bit words. The header length 104 in 32-bit words points to the beginning of the data 128. Type of Service 106 is an 8-bit field and indicates the quality of service desired. Some networks offer service precedence and other quality of service options for times of high traffic, service load, etc. Total Length 108 is a 16-bit field that indicates the total length of the datagram in bytes. Total length 108 includes the Internet header or headers and data. Identification 110 field is a 16-bit field containing an identifying value assigned by the sender to aid in assembling the fragments of a datagram. Flags 112 is a 3-bit field containing control flags regarding fragmentation of the datagram. Fragment Offset 114 is a 13-bit field that indicates where the instant fragment may fall in the entire datagram and is usually expressed in bytes. Time to Live (TTL) 116 is an 8-bit field that indicates the maximum number of routers through which the IP datagram can pass. Protocol 118 is an 8-bit field indicating the next level protocol used in the data portion of the Internet datagram. Checksum 120 is a 16-bit field having a checksum on the header only. Source IP address 122 is a 32-bit field indicating the address of the datagram source, and Destination IP address 124 is a 32-bit field indicating the address of the datagram destination or intended recipient. Options 126 may or may not appear in a datagram, and the field is variable in length. Finally, Data 128 includes the data or a next level protocol header.

Figure 4:
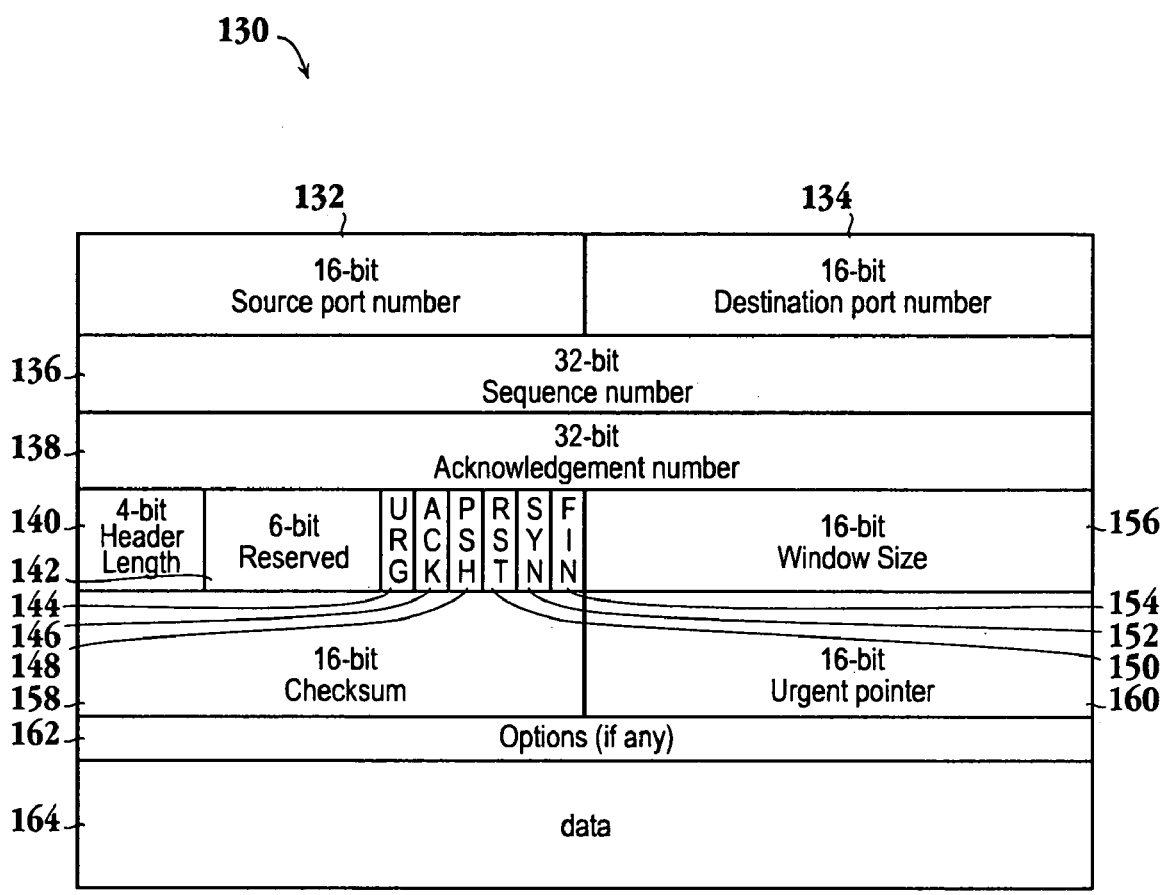
FIG. 4 is an essentially standard TCP header.

FIG. 4 is an essentially standard TCP header 130. As described above in reference to the IP header 100 illustrated in FIG. 3, embodiments of the present invention provide for specific information to be written to particular fields in both the IP header 100 (see FIG. 3), and the TCP header 130, to create a connectionless TCP/IP header. For completeness, each field in the TCP header 130 in FIG. 4 is identified and generally described.

Source port number 132 is a 16-bit field containing the source port number, and Destination port number 134 is a 16-bit field containing the destination port number. Sequence number 136 is a 32-bit field containing the first data octet in this segment, unless SYN is present. If SYN is present, the sequence number 136 is the initial sequence number and the first data octet. Acknowledgement number 138 is a 32-bit field that, if the ACK control bit is set, contains the value of the next sequence number which the sender of the segment is expecting to receive. Header Length 140 is a 4-bit field indicating the number of 32-bit words in the TCP header 130. Header length 140 points to the beginning of data 164. Reserved 142 field is a 6-bit field that must be set to zero. Fields URG 144, ACK 146, PSH 148, RST 150, SYN 152, and FIN 154, together comprise 6 bits and are control bits. Window size 160 is a 16-bit field indicating the number of data octets which the sender of this segment is willing to accept, which defines the window size, framing the data exchanged. Checksum 158 is a 16-bit field containing a checksum for the TCP header 130. Urgent pointer 160 is a 16-bit field communicating the current value of the urgent pointer as a positive offset from the sequence number in this segment. The field is only applicable to headers in which the URG 144 control bit is set. Options 162 may or may not be present, have a length of a multiple of 8 bits, if present, and are included in the checksum 158. Finally, data 164 is a field of variable length containing the data, or a next level protocol header.

As is well known, the IP is defined by standard, and the IP header 100 (see FIG. 3) is the routing identifier and instructions used to route datagrams from host to host. TCP, also defined by standard, essentially provides the reliability to the datagram transmission through acknowledgement, verification, and re-transmission where appropriate. It should therefore be understood that, in order to create and transmit with a connectionless TCP/IP header, the data fields of the header need to be in accordance with the corresponding TCP/IP standards, and that credible, valid, information must be contained in the appropriate data fields of the header.

In one embodiment of the present invention, a connectionless TCP/IP header is created by defining data values to be transmitted in the fields corresponding to the Window size 156 shown in FIG. 4. No additional or extra bits are introduced, and none of the reserved bits are used. In one embodiment, the window size 156 (see FIG. 4) field is used to define a connectionless TCP/IP header. Since no acknowledgement is transmitted in data exchange using a connectionless TCP/IP header, the window size 156 field is of little relevance to the data exchange in embodiments of the present invention. The 16-bit window size 156 field is sub-divided into an upper byte and a lower byte. In one embodiment of the invention, a pre-defined value is written to the lower byte of the 16-bit window size 156 field to identify the connectionless TCP/IP header. In other words, the pre-defined value written to the lower byte of the window size 156 field identifies the datagram as a connectionless TCP/IP transmission, differentiating the datagram from standard TCP/IP transmissions. In other embodiments, the pre-defined value can be written to the upper byte of the window size 156 field.

In addition to the pre-defined value in the lower byte of the window size 156 field, in one embodiment, the upper byte of the window size 156 field shall carry a special checksum, described in greater detail below, to verify and confirm that the datagram is a connectionless TCP/IP datagram. In an embodiment in which the pre-defined value is written to the upper byte of the window size 156 field, the special checksum is written to the lower byte of the window size 156 field. In one embodiment, if the pre-defined value in the lower byte of the window size 156 field identifies the received packet as a connectionless TCP/IP datagram, and the checksum in the upper byte of the window size 156 field of a connectionless TCP/IP header validates the identification, the datagram will be treated and processed as a connectionless TCP/IP transmission.

Figure 5:
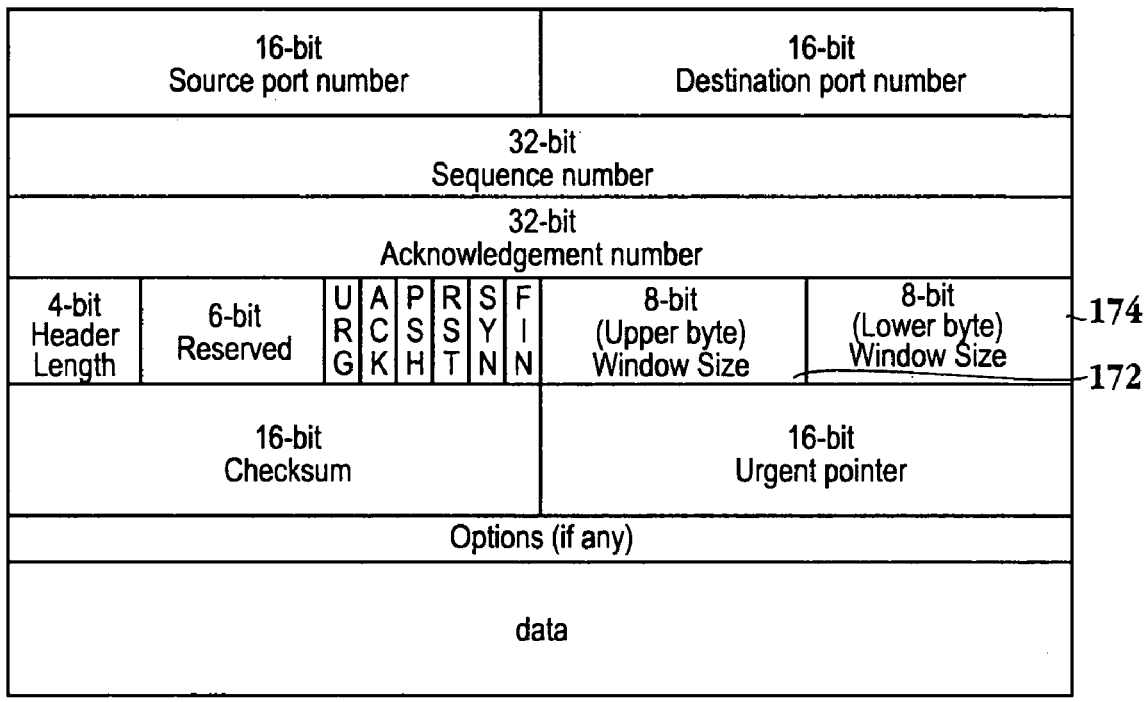
FIG. 5 is a connectionless TCP header in accordance with one embodiment of the present invention.

FIG. 5 is a connectionless TCP header 170 in accordance with one embodiment of the present invention. As described above, the connectionless TCP header 170 is essentially the same as a regular TCP header 130 (see FIG. 4), with the above described modification to the window size field. As shown in FIG. 5, the window size field has been subdivided into an upper byte 172 and a lower byte 174. All remaining fields are essentially identical to the regular TCP header 130 as illustrated in FIG. 4. In one embodiment of the invention, a checksum is written to the upper byte 172 of the window size field, and a pre-defined value is written to the lower byte 174 of the window size field. The pre-defined value and the checksum identify the datagram as a connectionless TCP/IP datagram. In other embodiments, the pre-defined value and the checksum are written to the upper and lower bytes of the window size 156 field, respectively.

Figure 6:
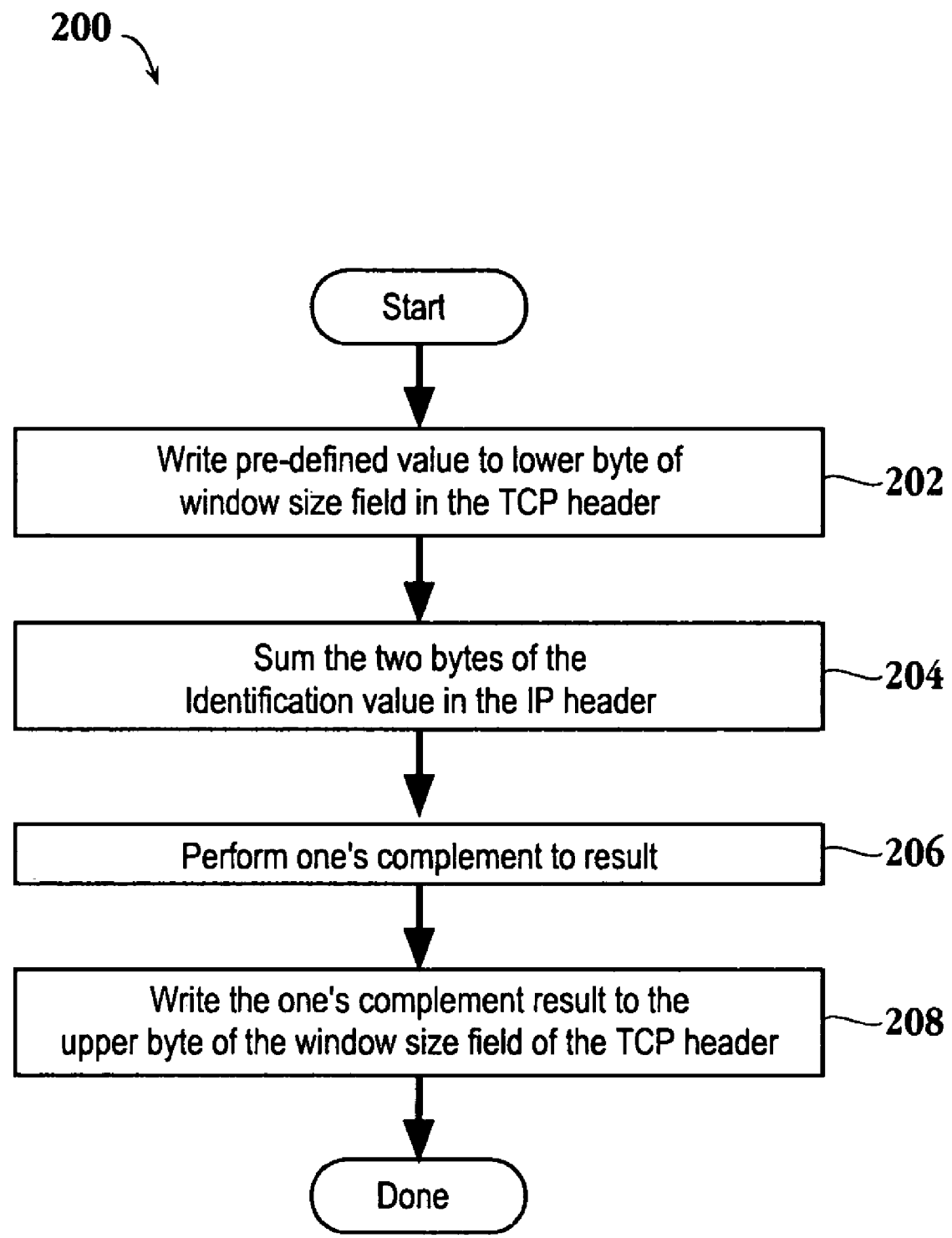
FIG. 6 shows a flow chart diagram of the method operations performed by a sender to construct a connectionless TCP/IP header for data transmission, in accordance with one embodiment of the present invention.

Actions of a sender and a receiver of a connectionless TCP/IP transmission are used to illustrate data exchange using a connectionless TCP/IP header. FIG. 6 shows a flow chart diagram 200 of the method operations performed by a sender to construct a connectionless TCP/IP header for data transmission, in accordance with one embodiment of the present invention. The method begins with operation 202 in which a pre-defined value is written to the lower byte of the window size field of an otherwise typical TCP standard header block to identify a connectionless TCP/IP datagram. A typical TCP standard header block is illustrated in FIG. 4, and a connectionless TCP header is shown in FIG. 5. In one embodiment, the pre-defined value can be any number between 0 and 225, and in one embodiment the pre-defined number is an odd number.

The method continues with operation 204 in which the two bytes of the Identification value in the IP header are summed. A typical IP standard header is illustrated in FIG. 3. In an embodiment of the present invention, the identification field must have valid data to be recognized as a proper IP header. In operation 204, the existing value is summed, and the result will be used to further verify that the identified connectionless TCP/IP header is in fact a connectionless TCP/IP header. In other embodiments of the invention, any desired valid and reliable field or combination of fields can be used to calculate the checksum.

Next, in operation 206, a one's complement calculation is performed on the result of operation 204. A one's complement calculation is a common checksum calculation used in various operations and fields in datagrams. In an embodiment of the present invention, a one's complement calculation utilizes an existing value in a header field, and thereby defines a field to verify the connectionless TCP/IP header.

The method concludes with operation 208 in which the one's complement result from operation 206 is written to the upper byte of the window size field of the TCP header. The upper byte of the window size field then contains the calculated one's complement checksum, and the lower byte contains the pre-defined value written in operation 202. In other embodiments, the pre-defined value may be written to the upper byte of the window size field, and the checksum may be written to the lower byte of the window size field. As will be described below in reference to FIG. 7, the connectionless TCP/IP header is constructed to present as a valid TCP/IP header, but before acknowledgement or other transmission is conducted, the header is examined to determine if the data is formatted in a connectionless TCP/IP header. With the writing of the one's complement result in operation 208, the method is done.

Figure 7:
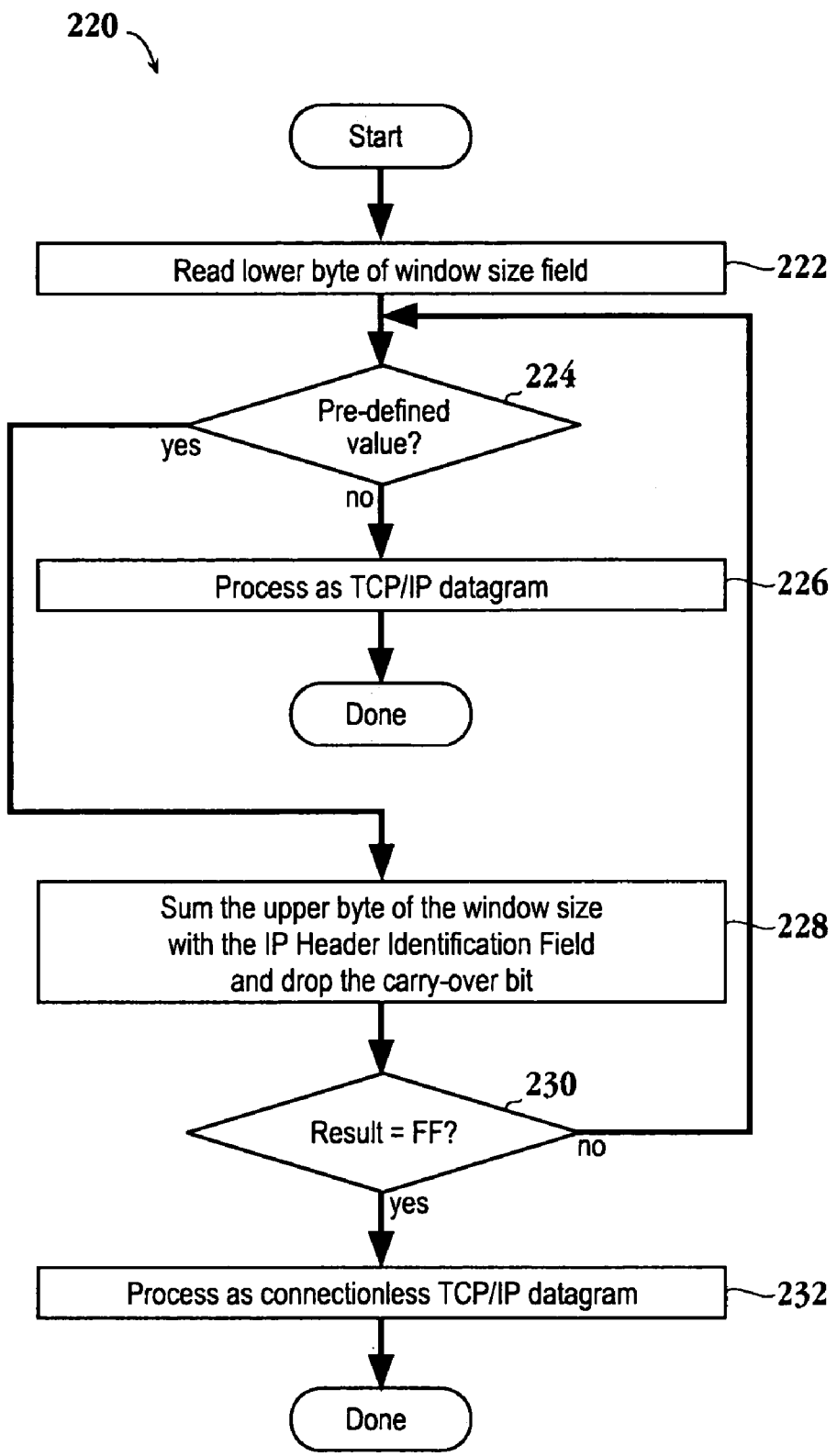
FIG. 7 is a flowchart diagram illustrating the method operations performed by a receiver to determine whether a datagram includes a connectionless TCP/IP header, in accordance with one embodiment of the present invention.

Recognition of a connectionless TCP/IP header by a receiver or receiving application is necessary to realize the desired UDP-type processing of the datagram. FIG. 7 is a flowchart diagram 220 illustrating the method operations performed by a receiver or receiving application to determine whether a datagram includes a connectionless TCP/IP header, in accordance with one embodiment of the present invention.

The method begins with operation 222 in which the lower byte of the window size field of the TCP portion of the connectionless TCP/IP header is read. As described above in reference to flowchart diagram 200, a first identifier of a connectionless TCP/IP header is a pre-defined value written to the lower byte of the window size field. In operation 222, a first step by the receiver is to read the lower byte of the window size field.

The method continues with decision block 224 in which it is determined whether the value read from the lower byte of the window size field in operation 222 is a pre-defined value identifying the header as a connectionless TCP/IP header. As will be described in greater detail below, the value can be any number between 0 and 225, and in one embodiment the value is an odd number.

The method continues with decision block 224 in which it is determined if the value in the lower byte of the window size field is the pre-determined value. If the value is not the pre-determined value, a "no" to decision block 224, the method proceeds to operation 226 in which the datagram is assumed to be a regular TCP/IP datagram and is processed as a TCP/IP datagram, and the method is done. If the value in the lower byte of the window size field is the predetermined value, a "yes" to decision block 224, the method continues with operation 228.

In operation 228, the upper byte of the window size field is summed with the IP Header identification field, and the carry-over bit is dropped. In other words, the result of the sum of the upper byte of the window size field and the IP Header identification field is truncated to a byte. In decision block 230, it is determined whether the result is "FF." If the result is "FF," a "yes" to decision block 230, the method proceeds to operation 232 in which the datagram is processed as a connectionless TCP/IP datagram, and the method is done. If, in decision block 230, it is determined the result is not "FF," a "no" to decision block 230, the method loops back to operation 226 in which the datagram is processed as a regular TCP/IP datagram, and the method is done.

In one embodiment of the invention, a connectionless TCP/IP header is constructed and transmitted to effect essentially UDP data exchange with the access of TCP/IP. As described above in reference to FIGS. 6 and 7, a connectionless TCP/IP header is constructed for data transmission. The data to which the connectionless TCP/IP header is attached is a UDP datagram. In one embodiment of the invention, the processing of a connectionless TCP/IP datagram includes stripping the connectionless TCP/IP header from the datagram to which it is attached, and then processing the underlying datagram in accordance with whatever the protocol for the underlying datagram may be. For audio and video exchange in a video conference, for example, the audio and video data might be formatted as a UDP datagram. A connectionless TCP/IP header is constructed, and attached to the audio and video UDP datagram. A sender transmits the connectionless TCP/IP datagram, and the receiver receives the connectionless TCP/IP datagram. As the receiver processes the connectionless TCP/IP datagram, it is identified as a connectionless TCP/IP datagram. The connectionless TCP/IP header is stripped from the underlying datagram which is processed according to its own protocol, which in this example is the UDP audio and video data. The data is processed according to UDP protocol, and so no acknowledgement, request for retransmission, and so forth is transmitted. The reliability of TCP/IP is discarded, but the access of cross-firewall transmission is retained, and the speed of UDP is realized.

In one embodiment of the invention, the lower byte of the TCP window size field (174 in FIG. 5) contains a pre-defined value to indicate the header is a connectionless TCP/IP header. The assigning of a specific, pre-defined value to the lower byte 174 of the window size field essentially reduces the probability of mis-identification to approximately $\frac{1}{125}$.

The pre-defined value written to the lower byte 174 of the window size field can be any number between 0 and 225, and in one embodiment, the pre-defined value is an odd number. It should be appreciated than most window size values in standard TCP/IP headers are multiples of $2^x$, which is an even number. By choosing an odd number, the chance of mis-identifying a connectionless TCP/IP header is drastically reduced.

Further, having a checksum of the 2 bytes of the IP header field (110 of FIG. 3), and having the checksum define the value of the upper byte of the window size field (172 in FIG. 5), results in a probability of mis-identification of a connectionless TCP/IP to approximately $\frac{1}{256} * \frac{1}{256}$. The overall probability of misidentifying a connectionless TCP/IP header therefore is approximately $\frac{1}{256} * \frac{1}{256} * \frac{1}{256}$, or 0.0000059604644775390625%. It should be appreciated that, even if a regular TCP/IP datagram were mis-identified as a connectionless TCP/IP datagram, the result would be a request for re-transmission of the packet by the original TCP/IP application for which the packet was intended. The receiver, or the receiving application, that received the mis-identified packet typically discards the packet as an erroneous packet. In an H323 video conferencing session, for example, the mis-identified packet would simply be processed as a corrupted packet and would be discarded by the TCP/IP stack or the application itself.

Figure 8:
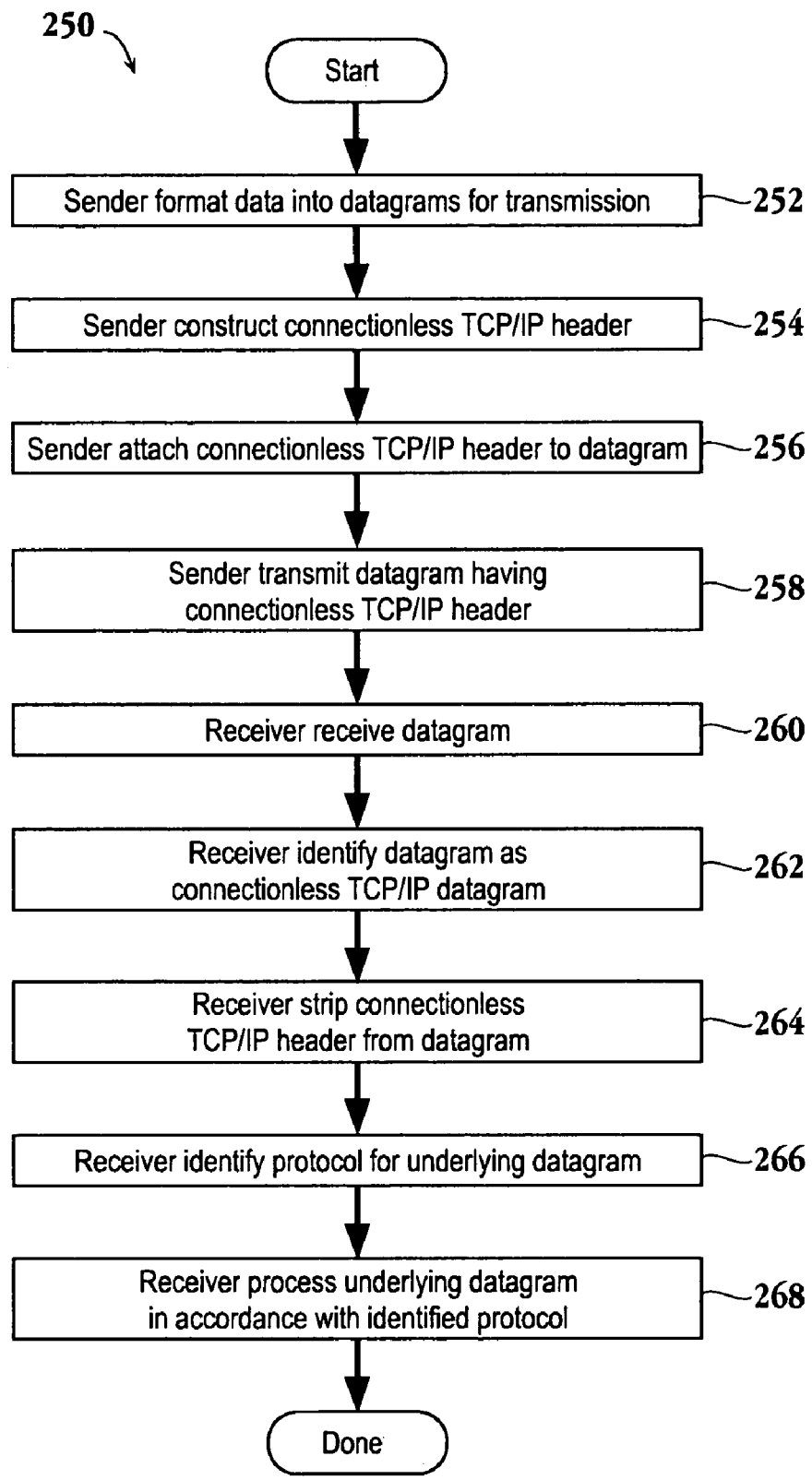
FIG. 8 is a flow chart diagram illustrating the method operations performed to effect data exchange using a connectionless TCP/IP datagram, in accordance with one embodiment of the present invention.

FIG. 8 is a flow chart diagram 250 illustrating the method operations performed to effect data exchange using a connectionless TCP/IP datagram, in accordance with one embodiment of the present invention. The method begins with operation 252 in which a sender formats data into datagrams for transmission. In one embodiment, the data is audio and video data in an H323 video conferencing session. As described above, a video conferencing session is exemplary of Internet data exchange in which speed is paramount, and reliability is less important. UDP/IP data exchange might be an ideal transmission protocol to achieve high speed, with less reliability, but in many corporate Internet environments, for example, UDP protocol is severely restricted or blocked. In embodiments of the present invention, real time media data such as audio and video data is formatted into UDP datagrams in operation 252.

The method continues with operation 254 in which the sender constructs a connectionless TCP/IP header, which will be attached to the data formatted in operation 254. The construction of the connectionless TCP/IP header includes writing a pre-defined value to a lower byte of the window size field of a TCP header. The pre-defined value can be any number between 0 and 225, and in one embodiment the pre-defined value is an odd number. Next, the two bytes of the identification value in the IP header (see FIG. 3) are summed, and a one's complement is calculated from the result. The value of the one's complement is written as a checksum to the upper byte of the window size field in the TCP header, creating a connectionless TCP/IP header. As described above, in other embodiments of the present invention, the checksum may be written to the lower byte of the window size field and the pre-defined value may be written to the upper byte of the window size field. Additionally, any field or combination of fields having valid and credible data can be used to calculate the checksum.

Next, in operation 256, the sender attaches the connectionless TCP/IP header to the datagram, and in operation 258, the sender transmits the datagram having the connectionless TCP/IP header to a receiver. When transmitted over the Internet, the connectionless TCP/IP datagram appears as a regular TCP/IP datagram with valid and credible values in all of the fields of the header. The data transmission of the connectionless TCP/IP datagram is therefore at the same precedence and using essentially the same protocol as a regular TCP/IP datagram.

In operation 260, the connectionless TCP/IP datagram is received by a receiver or receiving application. As is known, in data exchange the roles of sender and receiver alternate and shift among participants, data servers, and the like. In the present example, a sender and a receiver are described and can include any participant in a data exchange functionally serving as a sender or a receiver, including participants, data servers, media servers, etc.

The method continues with operation 262 in which the receiver identifies the datagram as a connectionless TCP/IP datagram. In one embodiment, the receiver checks the lower byte of the window size field of the connectionless TCP header. If a pre-determined value is identified, the receiver then sums the upper byte of the window size field of the connectionless TCP header with the identification field of the IP header. If, after dropping the carry-over bit from the result, the resulting value is "FF", the receiver has identified the header as a connectionless TCP/IP header to be processed accordingly.

The method continues with operation 264 in which the processing of the connectionless TCP/IP datagram includes stripping the connectionless TCP/IP header from the datagram. In one embodiment, the stripping of the connectionless TCP/IP header leaves the datagram that was formatted in operation 252. In an embodiment in which the datagram is real time audio and video data from an H323 video conferencing session, the underlying datagram might be formatted as a UDP datagram. An H323 video conferencing session may include other media data, and other data, in which reliability is paramount. In such an example, the underlying datagram might be formatted to utilize highly reliable regular TCP/IP transmission protocol.

In operation 266, the receiver identifies the protocol for the underlying datagram, and in operation 268, the method concludes with the receiver processing the underlying datagram in accordance with the identified protocol. In the example of the connectionless TCP/IP protocol used to transmit UDP real time audio and video data, there is no acknowledgement, verification, or request for retransmission. A receiver, in one embodiment, conducts error correction on the received data, but then any missed, garbled, or erroneous received data is compensated for, and rapid processing of the data is achieved and maintained.

In summary, embodiments of the present invention enable data exchange of less reliable, but fast, UDP data in a network and Internet security environment in which TCP/IP protocol is increasingly required. A UDP, TCP, ICMP, or any IP encapsulated protocol, datagram is packaged in a connectionless TCP/IP header which appears essentially as a regular TCP/IP header and datagram. Upon receipt, the datagram is identified as a connectionless TCP/IP datagram, the connectionless TCP/IP header is stripped from the datagram, and the data is processed in accordance with the original or underlying protocol that remains after the connectionless TCP/IP header is removed. The connectionless TCP/IP header does not automatically initiate a response such as an acknowledgement, a verification, a request for re-transmission, and so forth. In one embodiment, the connectionless TCP/IP header enables transmission over the Internet and other networks that may prioritize or require the TCP/IP protocol, but the identification of datagram as a connectionless TCP/IP datagram results in the header being stripped from the underlying datagram and precludes traditional acknowledgement and other reliability data exchange.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of conducting a communication exchange between systems over a communication network, comprising: formatting of data by a first system into an IP datagram with an IP header and one of a TCP and a UDP header; constructing a connectionless TCP/IP header to add to the formatted data, the connectionless TCP/IP header including a pre-defined identifying value in a designated field corresponding to a window size field of the connectionless TCP/IP header for identifying the connectionless TCP/IP header; transmitting the formatted data having the connectionless TCP/IP header from the first system to a second system; verifying the pre-defined identifying value in the designated field and identifying the connectionless TCP/IP header; removing the identified connectionless TCP/IP header from the IP datagram; and processing the IP datagram.

2. The method of claim 1, further comprising:
formatting of data by the second system into an IP datagram with an IP header and one of a TCP and a UDP header;
constructing an other connectionless TCP/IP header to add to the formatted data, the other connectionless TCP/IP header including an other pre-defined identifying value in a same designated field of the other connectionless TCP/IP header as the designated field of the connectionless TCP/IP header;
transmitting the data formatted by the second system and having the other connectionless TCP/IP header from the second system to the first system;
verifying the other pre-defined identifying value in the same designated field and identifying the other connectionless TCP/IP header;
removing the identified other connectionless TCP/IP header from the IP datagram; and
processing the IP datagram.

3. The method of claim 1, wherein the removing of the connectionless TCP/IP header provides for processing UDP data without verification and without acknowledgement.

4. The method of claim 1, wherein the connectionless TCP/IP header further includes a checksum in an other designated field, the checksum validating the pre-defined identifying value in the designated field of the connectionless TCP/IP header.

5. The method of claim 1, wherein the designated field is an upper byte of a Window Size field of the connectionless TCP/IP header.

6. The method of claim 4, wherein the other designated field is a lower byte of the Window Size field of the connectionless TCP/IP header.

7. The method of claim 4, wherein the checksum is calculated by performing a one's complement to a sum of a first byte and a second byte of a two byte Identification field of the connectionless TCP/IP header.

8. The method of claim 7, wherein the checksum is verified by summing the checksum and the two byte Identification field, and then truncating a result to a single byte, the truncated result being equal to a hexadecimal value of "FF."

9. In a video conferencing system, a method of communication between cooperating systems, comprising: constructing a connectionless TCP/IP header, the connectionless TCP/IP header having a flag in a designated field corresponding to a window size field of the connectionless TCP/IP header for identifying the connectionless TCP/IP header and a checksum in an other designated field corresponding to the window size field of the connectionless TCP/IP header for validating the connectionless TCP/IP header; attaching the connectionless TCP/IP header to an IP datagram; and transmitting the IP datagram with the connectionless TCP/IP header, wherein the connectionless TCP/IP header is removed by a receiving cooperating system and the IP datagram is processed without transmitting acknowledgement and without requesting verification.

10. The method of claim 9, wherein the designated field is an upper byte of the Window Size field of the connectionless TCP/IP header.

11. The method of claim 9, wherein the other designated field is a lower byte of the Window Size field of the connectionless TCP/IP header.

12. The method of claim 9, wherein the checksum is calculated-by performing a one's complement to a sum of a first byte and a second byte of a two byte Identification field of the connectionless TCP/IP header.

13. The method of claim 12, wherein the checksum is verified by summing the checksum and the two byte Identification field, and then truncating a result to a single byte, the truncated result being equal to a hexadecimal value of "FF."

14. A communication protocol for establishing and maintaining an exchange between cooperating systems, the communication protocol comprising: formatting data to be transmitted into an IP datagram; attaching a connection less TCP/IP header to the IP datagram; transmitting the IP datagram with the connectionless TCP/IP header as a new IP datagram; receiving the new IP datagram; identifying the connectionless TCP/IP header; removing the connectionless TCP/IP header from the new IP datagram; and processing the new IP datagram, wherein the new IP datagram is processed without acknowledgement and without transmitting a request for verification, wherein the connectionless TCP/IP header includes a pre-defined identifying value in a designated field corresponding to a window size field of the connectionless TCP/IP header for identifying the connectionless TCP/IP header and a checksum in another designated field corresponding to the window size field of the connectionless TCP/IP header for validating the connectionless TCP/IP header.

15. The communication protocol of claim 14, wherein the pre-defined value is an odd number, and the designated field is an upper byte of the Window Size field.

16. The communication protocol of claim 14, wherein the other designated field is a lower byte of the Window Size field.

17. The communication protocol of claim 14, wherein the checksum is calculated by performing a one's complement to a sum of a first byte and a second byte of a two byte Identification field of the connectionless TCP/IP header.

18. The communication protocol of claim 17, wherein the checksum is verified by summing the checksum and each byte of the two byte Identification field, and then truncating a result to a single byte, the truncated result being equal to a hexadecimal value of "FF."

19. The communication protocol of claim 14, wherein the IP datagram is a UDP datagram.

20. An integrated circuit chip for exchanging communication between cooperating systems, comprising: logic for constructing a connectionless TCP/IP header, the connectionless TCP/IP header including a flag in a designated field corresponding to a window size field of the connectionless TCP/IP header for identifying a communication as a connectionless TCP/IP communication; and logic for constructing a checksum in an other designated field corresponding to the window size field of the connectionless TCP/IP header for verifying the communication is a connectionless TCP/IP communication; logic for identifying the flag in the designated field to identify the communication as a connectionless TCP/IP communication; logic for verifying the checksum to validate the communication is a connectionless TCP/IP communication; logic for removing the connectionless TCP/IP header from an IP datagram; and logic for processing the IP datagram without the connectionless TCP/IP header, wherein the processing of the IP datagram is without transmission of acknowledgement and without transmission of a request for verification.

21. The integrated circuit chip of claim 20, wherein the IP datagram is a UDP datagram.

22. The integrated circuit chip of claim 20, wherein the flag is an odd number, and the designated field is an upper byte of the Window Size field of the connectionless TCP/IP header.

23. The integrated circuit chip of claim 20, wherein the checksum is written to another designated field, the other designated field being a lower byte of the Window Size field of the connectionless TCP/IP header.

24. The integrated circuit chip of claim 20, wherein the checksum is calculated by performing a one's complement to a sum of a first byte and a second byte of a two byte Identification field of the connectionless TCP/IP header.

25. The integrated circuit chip of claim 20, wherein the verifying of the checksum includes summing the checksum and each byte of a two byte Identification field of the connectionless TCP/IP header, and then truncating a result to a single byte, the truncated result being equal to a hexadecimal value of "FF."

26. A computer readable storage device having program instructions executable by a computer for exchanging communication between cooperating systems, comprising: program instructions for constructing a connectionless TCP/IP header, the connectionless TCP/IP header having a flag in a designated field corresponding to a window size field of the connectionless TCP/IP header for identifying the connectionless TCP/IP header and a checksum in an other designated field corresponding to the window size field of the connectionless TCP/IP header for validating the connectionless TCP/IP header; program instructions for attaching the connectionless TCP/IP header to an IP datagram; and program instructions for transmitting the IP datagram with the connectionless TCP/IP header, wherein the connectionless TCP/IP header is removed by a receiving cooperating system and the IP datagram is processed without transmitting acknowledgement and without requesting verification.

27. The computer readable storage device of claim 26, wherein the designated field is an upper byte of the Window Size field of the connectionless TCP/IP header.

28. The computer readable storage device of claim 26, wherein the other designated field is a lower byte of the Window Size field of the connectionless TCP/IP header.

29. The computer readable storage device of claim 26, wherein the checksum is calculated by performing a one's complement to a sum of a first byte and a second byte of a two byte Identification field of the connectionless TCP/IP header.

30. The computer readable storage device of claim 26, wherein the checksum is verified by summing the checksum and the two byte Identification field, and then truncating a result to a single byte, the truncated result being equal to a hexadecimal value of "FF."

* * * * *

UNITED STATES PATENT AND TRADEMARK OFFICE
CERTIFICATE OF CORRECTION

PATENT NO. : 7,263,071 B2  
APPLICATION NO. : 10/681732  
DATED : August 28, 2007  
INVENTOR(S) : Wai Yim Page 1 of 1

It is certified that error appears in the above-identified patent and that said Letters Patent is hereby corrected as shown below:

Column 12, line 34

Please change "connection less" to --connectionless--

Signed and Sealed this

Twenty-ninth Day of April, 2008

JON W. DUDAS  
*Director of the United States Patent and Trademark Office*